May 13, 1930. G. A. MEAD 1,757,973

METHOD AND MEANS OF ELECTRICALLY CONNECTING RAILS

Original Filed Jan. 17, 1928

Witness:
H. J. Stromberger

Inventor
George A. Mead

Patented May 13, 1930

1,757,973

UNITED STATES PATENT OFFICE

GEORGE A. MEAD, OF MANSFIELD, OHIO, ASSIGNOR TO THE OHIO BRASS COMPANY, OF MANSFIELD, OHIO, A CORPORATION OF NEW JERSEY

METHOD AND MEANS OF ELECTRICALLY CONNECTING RAILS

Application filed January 17, 1928, Serial No. 247,329. Renewed March 26, 1929.

My invention relates to the electrical connecting of the adjacent ends of rails used in conducting electric current and has particular reference to connecting such rails in which the fish plate or splice bar is seam welded to the rails.

The object of my invention is to provide an efficient connection between the adjacent ends of rails in which the splice bars are welded to the rails by means of a welded seam of steel. In such cases it is not unusual to leave a short space or unwelded portion on each side of the abutting faces of the rails, and I utilize this custom by welding the plate and rails to each other at this point by means of a high conductivity metal, such as copper.

My invention resides in the new and novel construction combination and relation of the parts hereinafter described and shown in the attached drawing and in the steps employed in the method of forming the construction.

In the drawing accompanying this specification:

It is quite customary, nowadays to not only bolt the fish plates used in supporting the adjacent ends of rails to the rails, but to also seam-weld the plates to the rails along the longitudinal adjacent surfaces and to leave a short length of unwelded portion on each side of the abutting faces. In such construction it is usual to bring the faces of the rails in strong abutting relation and so positioning the transverse holes in the fish plate and the web of the rail that the bolts will engage the sides of the transverse holes through the fish plates and web of the rail and thereby assist in holding the rails with their faces in abutting relation.

Such a construction has been found highly efficient from a mechanical standpoint, and offers a high degree of electrical conductivity from rail to rail, but it is my desire to improve the electrical conductivity and I do so by utilizing the aforesaid gap in the longitudinal welding at the joint between the abutted faces of the rails, and weld into the space copper, preferably alloyed with a deoxidizing or reducing element such as manganese silicon, phosphorus, etc.

Figure 1:
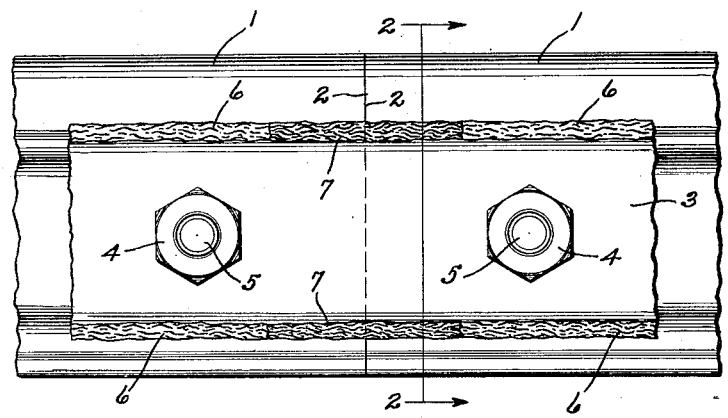
Fig. 1 is a side view and elevation showing two rails in abutted relation with a portion of the fish plate bolted thereto and welded in position and with a welded portion connecting the ends of the rails formed by high conductivity metal.
Figures 2, 3:
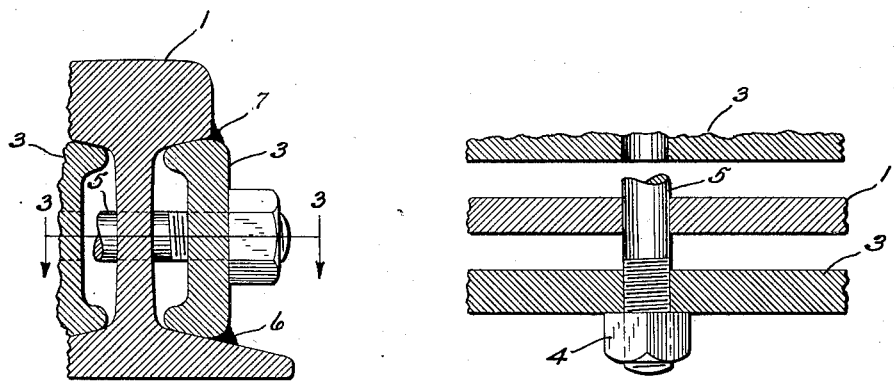
Fig. 2 is a sectional view of Fig. 1 on the line 2—2.
Fig. 3 is a sectional view on the line 3—3 of Fig. 2.

Referring to Fig. 1, I have shown two rails 1 having their faces 2 in abutted relation. The same effect of abutting the faces can be secured by leaving a slight space between the faces of the rails, and after the fish plates 3 have been placed in position and the nuts 4 and bolts 5 drawn up as tightly as possible, a shim or wedge is driven between the adjacent faces of the rails, thereby forcing them apart as far as the bolts and plates will permit, and this will form a construction equivalent to abutting the faces 2 of the rails.

After positioning the fish plates with respect to the rails, the longitudinal edges of the fish plates adjacent to head and base of the rail are welded, thereby integrally uniting fish plates and rails. The welding is preferably done by means of an electric arc in which a steel electrode is used as is well known in the art, and a deposition of the electrode is made which integrally unites the parts. Between the inner ends of the deposited metal 6, I then fuse to the fish plate and rail ends a deposition 7 of copper, preferably alloyed with a deoxidizing or reducing agent, as above mentioned.

As the joint formed by means of the fish plates, bolts and seam-weld 6 is of a rigid construction, there is very little if any movement at the abutting faces, and therefore, there is very little tendency for the deposited copper 7 to be torn away from the plates or rails or its continuity throughout its longitudinal length broken.

In making the welds 6 and 7 a carbon arc with a separate rod of the metal to be deposited can be employed if desired. Both the metallic arc and the carbon arc methods of welding are well known to those schooled in the art.

Should the continuity of the deposited copper 7 be broken in the course of time, it is a very simple matter to re-establish the continuity or its integral relation with the rails or fish plate by applying thereto a carbon arc and refusing the metal 7, or this may be done by means of the oxy-acetylene flame.

Having disclosed my invention, I claim:

1. The method of electrically and mechanically uniting the adjacent ends of rails comprising the steps of rigidly uniting the rails together by bolting and steel welding thereto fish plates and leaving an unwelded portion at the adjacent ends of the rails, and extending back from the adjacent faces a predetermined distance, and then welding the plates and rails each to the other at the said unwelded portion by fusing to the plates and the rails a copper deposit which will connect electrically and mechanically the rails and a plate each to the other.

2. The method of electrically and mechanically connecting rail ends comprising positioning splice plates on opposite sides of the rails, and securing them to the rail by transverse means and placing the end faces of the rails in compression, then seam-welding with steel along the adjacent longitudinal edges of the plates and rail from the ends of the plates to a point adjacent the ends of the rails and thus completing the seam, welding between the steel seams by fusing to the plates and rails a copper seam which will connect each plate to the adjacent rail ends, thus bridging the joint formed by the rails with a high conductivity metal.

3. The method of electrically and mechanically connecting rail ends comprising bolting splice plates to the sides of the rail ends and drawing the bolts up tightly to securely support the rail ends and then seam-welding with a copper base metal along the adjacent longitudinal edges of the plates and rails to bridge the rail ends for a predetermined distance thereby uniting the plates and adjacent rail ends through the medium of the applied metal.

4. The method of electrically and mechanically connecting rail ends comprising positioning splice plates on opposite sides of the rails and securing them to the rail by seam welding with steel along the adjacent longitudinal edges of the plates and rail from the ends of the plates to a point adjacent to the ends of the rails and thus completing the seam, welding between the steel seam by fusing to the plates and rails a copper seam which will connect each plate to the adjacent rail ends, thus bridging the joint formed by the rails with a high conductivity metal.

5. A rail joint comprising two rails having their ends abut, a splice plate positioned at the side of the rails and bridging the rail ends, and an electrical connection between the rails comprising parallel seams of deposited copper fused to the plate and to the adjacent rail ends to connect the rails through the medium of the copper and splice plate.

6. A rail joint comprising two rails having their end faces under compression, means positioned on opposite sides of the rail ends to hold the rails against relative transverse and longitudinal movement and hold the end faces under compression and means electrically connecting the rail ends consisting of copper seam weld laid along the adjacent edges of each plate and the rails and fused to the rails and to the plate.

7. A rail joint comprising two rails having their ends abut, a splice plate positioned at the side of the rails and secured thereto and bridging the rail ends, and electrical connection between the rails comprising a deposit of copper base metal fused to the plate and rails adjacent their ends to electrically connect the rails through the medium of the copper for a predetermined distance back from the rail ends, and additional means connecting the plate to the rails comprising a connection of steel laid along the abutting edges of the plate and rail in substantial alinement with the aforesaid copper connection and fused to the plate and rail.

8. A rail joint comprising two rails having their ends abut, a splice plate positioned at the side of the rails and secured thereto and bridging the rail ends, a seam of steel laid along the adjacent longitudinal edge of the rails and plate to a point adjacent the rail ends and fused to the rails and plate and an electrical connection between the rails comprising a deposit of non-ferrous metal fused to the rails adjacent their ends and bridging the rail ends and in alinement with the seam of steel.

9. A rail joint comprising two rail ends bridged by a plate secured thereto by a fused seam of steel laid along the adjacent longitudinal edges of the rails and plate, and having in combination therewith a copper connecting member fused to the sides of the rail ends along the seam formed by the rails and plate.

10. A rail joint bridged by plates secured to opposite sides of the rail ends, having in combination therewith a seam weld of steel fused to the plate and rail along the abutting edges of the rails and plate and extending from the ends of the plate towards the adjacent rail ends for a predetermined distance and a seam of copper fused to the rails and plate in alinement with the weld of steel.

11. A rail joint comprising abutting rails, plates secured to the opposite sides of the rails and bridging the rail ends, and seam welds positioned along the adjacent edges of the rails and plates consisting of alternately disposed deposits of ferrous and non-ferrous metal fused to the rails and plates.

12. A rail joint comprising a pair of alined rails and plates secured thereto and welded along the adjacent surfaces of the rails and plates, a receptacle positioned on the side of the rail head and fused copper positioned in the receptacle and fused to the surface of the rail and receptacle.

In testimony whereof I affix my signature.

GEORGE A. MEAD.